United States Patent
du Crest et al.

(10) Patent No.: US 7,551,580 B2
(45) Date of Patent: Jun. 23, 2009

(54) RADIO TELECOMMUNICATIONS SYSTEM AND METHOD OF OPERATING THE SAME WITH REDUCED DELAYS FOR DATA TRANSMISSION OVER A RADIO INTERFACE

(75) Inventors: Gilles du Crest, Meudon (FR); Stéphane Cayla, Viroflay (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 689 days.

(21) Appl. No.: 10/257,436

(22) PCT Filed: Apr. 19, 2001

(86) PCT No.: PCT/EP01/04426

§ 371 (c)(1),
(2), (4) Date: Jun. 2, 2003

(87) PCT Pub. No.: WO01/82531

PCT Pub. Date: Nov. 1, 2001

(65) Prior Publication Data

US 2004/0047292 A1    Mar. 11, 2004

(30) Foreign Application Priority Data

Apr. 25, 2000    (EP)    ................... 00401142

(51) Int. Cl.
*H04W 4/00* (2009.01)
*H04L 12/28* (2006.01)
*H04W 72/00* (2009.01)

(52) U.S. Cl. .............. 370/329; 370/431; 455/450

(58) Field of Classification Search ............... 370/351, 370/389, 395.1, 398, 399, 229, 235, 310, 370/315, 316, 319, 321, 322, 230, 340, 341, 370/357, 360, 366, 368, 329, 431, 462, 463, 370/331–334; 455/450, 436–444
See application file for complete search history.

(56) References Cited

U.S. PATENT DOCUMENTS

| | | | | |
|---|---|---|---|---|
| 4,625,306 A | * | 11/1986 | Newman | ............ 370/422 |
| 5,640,395 A | * | 6/1997 | Hamalainen et al. | ........ 370/322 |
| 5,699,355 A | * | 12/1997 | Natarajan | .............. 370/322 |
| 5,962,392 A | | 10/1999 | Revell | ............... 510/372 |
| 5,965,033 A | | 10/1999 | Huss | ................ 210/759 |

(Continued)

FOREIGN PATENT DOCUMENTS

EP    0681406  A1    11/1995

(Continued)

*Primary Examiner*—Aung S Moe
*Assistant Examiner*—Kerri M Rose
(74) *Attorney, Agent, or Firm*—Barnes & Thornburg LLP

(57) ABSTRACT

A radio telecommunications system and method of operating the same is described which provides a reduce delay for transfer of packet data. Before a data transmission is released in one direction (uplink or downlink) a channel is reserved in the other direction. The channel reservation may be held for a certain period of time, e.g. 5 seconds after which the channel is released. The present invention is particularly useful when there is a large asymmetry in data transfer between uplink and downlink.

35 Claims, 10 Drawing Sheets

U.S. PATENT DOCUMENTS

| | | | |
|---|---|---|---|
| 6,229,800 B1 * | 5/2001 | Thompson et al. | 370/347 |
| 6,277,414 B1 | 8/2001 | Elhaik | 424/616 |
| 6,302,968 B1 | 10/2001 | Baum | 134/30 |
| 6,501,745 B1 * | 12/2002 | Turina et al. | 370/337 |
| 6,683,860 B1 * | 1/2004 | Forssell et al. | 370/329 |
| 6,778,509 B1 * | 8/2004 | Ravishankar et al. | 370/322 |
| 6,836,469 B1 * | 12/2004 | Wu | 370/322 |

FOREIGN PATENT DOCUMENTS

| | | |
|---|---|---|
| EP | 0921662 A2 | 6/1999 |
| GB | 2257630 A | 1/1993 |
| WO | WO-96/03873 A1 | 2/1996 |
| WO | WO 98/24250 A2 | 6/1998 |
| WO | WO 98/44639 A2 | 10/1998 |

* cited by examiner

— Signaling interface
— Signaling and data transfer interface

RADIO TELECOMMUNICATIONS SYSTEM AND METHOD OF OPERATING THE SAME WITH REDUCED DELAYS FOR DATA TRANSMISSION OVER A RADIO INTERFACE

The present invention relates to wireless telecommunication networks as well as satellite systems, particularly wireless Local Area Networks (LAN) and Metropolitan Area Networks (MAN). It is particularly relevant to such telecommunication systems which have been optimized for data transmission of the bursty type and where there is an asymmetrical flow of data

TECHNICAL BACKGROUND

Traditionally, radio telecommunication systems have been designed almost exclusively for voice or for packet data. The delay or latency requirements, the bursty nature of communications and the asymmetry of the traffic in both cases are so different that separate designs are often proposed for the two different types of transmissions. Generally, voice allows only short delays, has a roughly symmetrical load in uplink and downlink and is not bursty. On the other hand, packet data transmissions can be very asymmetrical (e.g. a browser communicating with websites over the Internet), is often delay tolerant and is often bursty in nature. There have been several attempts to design systems to provide both data and voice in the same system. One such proposal is the ETSI General Packet Radio Service (GPRS) which is an overlay network on the circuit switched GSM system. A GPRS architecture proposed by ETSI in Technical Specification 3.6 is shown in FIG. 1. Shown mainly on the left of the diagram is a conventional GSM mobile telephone system for full duplex voice communications comprising a Mobile Switching Centre (MSC) a Base Station System (BSS) usually including a Base Station Controller (BSC) and a Base Transceiver Station (BTS), and a mobile terminal (MT) and a Home Location Register (HLR). Packet data services are limited to the Short Message Service (SMS) which is dealt with by an SMS Gateway Mobile Switching Centre (SMS-GMSC) and a Short Message Service Centre (SM-SC). Fax is dealt with as in an ordinary telephone system, e.g. via suitable modems and an Interworking Function (IWF) fax data is transmitted via circuit switching. Hence, conventional mobile telecommunications systems generally use what may be described as circuit switched data transmissions. GPRS adds two new nodes to such a system, namely the Serving GPRS Support Node (SGSN) and the Gateway GPRS Support node (GGSN), both of which may be seen as routers. The SGSN contains the identity of MT in its routing tables which are inserted when the MT registers with the network. The GGSN is connected to other data carrying networks, for example a Packet Data network (PDN), for the receipt and transmission of packets of data. As the GPRS system is in parallel to the GSM system information about change of location of the MT is also sent to the SGSN/GGSN.

The above hybrid system may be adapted to a Third Generation Mobile Telephone system such as the UMTS system as shown schematically in FIG. 2. Further details of such an implementation may be found in the book by Ojanperå and Prasad, "Wideband CDMA for Third Generation Mobile Communications", Artech House Publishers, 1998. Basically, the Radio Access Network (RAN) provides the network-side equipment for communicating with the MT. A GPRS SGSN and a UMTS MSC are provided in parallel between the RAN and the relevant network, i.e. or a PDN or a Public Service Telephone Network (PSTN), respectively.

GPRS provides a connectionless support for data transmission. However, in order to use the scarce resources on the radio air interface between the BTS and the MT, a circuit switched radio resource allocation is used. Thus, although the networks attached to the GGSN may operate in a completely connectionless way, the transmission of the data packets across the air interface makes use of conventional timeslot and frame management. Accordingly, at some position in the GPRS network a packet handler is required which prepares the packets for transmission in frames across the air interface and receives the frames from the air interface and prepares them for transmission to the data network. This unit may be called a Packet Control Unit (PCU) and may be placed at several alternative positions, e.g. in the Base Transceiver Station (BTS), in the Base Station Controller (BSC) or between the BSC and the SGSN. Generally, the PCU may be assigned to some part of the BSS—the base station system. Typically frame relay will be used between the PCU and the SGSN.

One particular advantage of GPRS is that several MT's can camp onto a single timeslot. The data blocks destined for a particular MT are identified by a specific Temporary Flow Identity (TFI). Hence, each MT which shares a timeslot with others decodes each block to determine if the block contains its TFI. Once a data transmission is completed the same TFI may be used for another transmission either with the same MT or with another MT. The TFI mechanism allows some optimization of usage of the radio resources. Whereas full duplex circuit switched transmission with packet data may include silences, the shared timeslots may be optimally filled with data for different MT's. This provides some optimization of the radio resource despite the bursty nature of data traffic. At the same time this data network is operated in parallel with voice communications, the basic protocols of both systems being the same.

The protocol stacks used by GPRS are shown in FIGS. 3 and 4. The GPRS protocols make a difference between transmission and signaling. The transmission protocols provide data transfer but also associated control information such as flow control, error detection, error correction and error recovery. The signaling plane provides control and signaling for attach and detach form the GPRS system, for controlling the routing path during user mobility, for controlling the assignment of network resources and providing supplementary services.

The setting up of circuit switched calls across the air interface in a GPRS network is shown in message flows in FIGS. 5 and 6. In FIG. 5 a data request is initiated by a mobile terminal (MT) using an access control channel, e.g. a Random Access Channel RACH. When a MT has some data to send it makes an Uplink Radio Connection Establishment Request specifying how much data is to be sent. The RAN replies with a confirmation message that the uplink radio link is provided and gives details of when and how the MT is to transmit, e.g. which timeslot and how much of the timeslot can be used. Then the data is transmitted by the MT on a traffic channel and the RAN disconnects the radio link after all data has been transmitted successfully. The data received by the RAN is forwarded to the SGSN and from there to the GGSN which removes any headers used for transporting the data up to this point and transfers the data to the relevant PDN, e.g. via the Internet to a remote server. As some time later the answer to the data arrives from the remote site, e.g. a service provider's server on the Internet. On receipt of this answer a downlink radio connection is set up by the RAN via a control channel and the answer data transferred via a traffic channel. After transfer the radio connection is released once again.

FIG. 6 shows a similar message scheme when the initiating message is downlink. Again, the downlink and uplink transfers are not coupled so that the downlink radio connection is released at the end of the downlink transmission and before the answering uplink transmission.

The above message procedures have a disadvantage. It is necessary to set up and tear down radio connections between each uplink and downlink data transfer. This causes delays as the network must wait until the radio resource is ready before the data can be transmitted. Any delays can be annoying to the MT user who expects from his/her mobile browser the same performance as with landline systems. From a system point of view the delay on the answering uplink transmission may not be so severe as the MT has its data usually stored on a suitable device, e.g. a lap- or palmtop, where storage space is probably not a limitation and the amount of data is usually small, anyway. On the other hand, the data coming from the Internet on the downlink in answer to a request from an MT is often of large volume. This means that a large buffering capacity must be provided in the GPRS system to keep the received data until the radio resources are ready. The provision of buffering capacity is described in EP-A-332 818. Due to the high asymmetry expected with browser traffic (estimates are at least 10 to 1), the level of buffering capacity on the downlink can be high which is costly to implement.

It is an object of the present invention to provide a data carrying cellular mobile radio telecommunications system and a method of operating the same which reduces delays, in particular on the downlink.

SUMMARY OF THE INVENTION

The present invention may provide a mobile radio telecommunications (RT) network for switching data between user terminals and a data network, the RT network comprising: a base station system including at least one radio transceiver; and at least one data radio traffic channel for communication between the RT network and the user terminals, data services requiring the setting up of a data traffic channel between a user terminal and the base station system;
wherein when a downlink data radio traffic channel is assigned to one of the user terminals;
the one user terminal is adapted to request reservation of an uplink data radio channel before the release of the assigned downlink data radio traffic channel. The at least one radio traffic channel may be capable of accommodating multiple data calls from at least two of the user terminals.

The present invention includes a mobile radio telecommunications (RT) network for switching data between user terminals and a data network, the RT network comprising:
a base station system including at least one radio transceiver; and
at least one data radio traffic channel for communication between the RT network and the user terminals, a data service requiring the setting up of a data traffic channel between a user terminal and the base station system;
wherein when an uplink data radio traffic channel is assigned to one of the user terminals;
the RT network is adapted to reserve a downlink data radio channel for the one user terminal before the release of the assigned uplink data radio traffic channel. The at least one radio traffic channel may be capable of accommodating multiple data calls from at least two of the user terminals. The accommodation of multiple data calls from at least two of the user terminals includes two or more user terminals sharing a traffic channel. The traffic channel may be a timeslot in a Time Division Multiple Access (TDMA) system. The sharing may also include use of the same code in a Code Division Multiple Access system. The user terminal may be a mobile terminal such as a mobile telephone or a stationary terminal, e.g. a laptop with a radio antenna The RT network is preferably a GPRS network.

The present invention includes a method of operating a mobile radio telecommunications (RT) network for switching data between user terminals and a data network, the RT network comprising a base station system including at least one radio transceiver; and at least one data radio traffic channel for communication between the RT network and the user terminals, a data service requiring the setting up of a data traffic channel between a user terminal and the base station system;

the method comprising the steps of:
assigning a downlink data radio traffic channel to one of the user terminals; and
the one user terminal requesting reservation of an uplink data radio channel before the release of the assigned downlink data radio traffic channel. The at least one radio traffic channel may be capable of accommodating multiple data calls from at least two of the user terminals.

The present invention also includes a method of operating a mobile radio telecommunications (RT) network for switching data between user terminals and a data network, the RT network comprising a base station system including at least one radio transceiver; and
at least one data radio traffic channel for communication between the RT network and the user terminals, a data service requiring the setting up of a data traffic channel between a user terminal and the base station system;

the method comprising the steps of:
assigning an uplink data radio traffic channel to one of the user terminals; and
reserving a downlink data radio channel for the one user terminal before the release of the assigned uplink data radio traffic channel. The at least one radio traffic channel may be capable of accommodating multiple data calls from at least two of the user terminals.

The present invention also includes a network element for use in a mobile radio telecommunications (RT) network for switching data between user terminals and a data network, the RT network comprising:
a base station system including at least one radio transceiver; and
at least one data radio traffic channel for communication between the RT network and the user terminals, a data service requiring the setting up of a data traffic channel between a user terminal and the base station system;
wherein when an uplink data radio traffic channel is assigned to one of the user terminals;
the network element is adapted to initiate reservation of a downlink data radio channel for the one user terminal before the release of the assigned uplink data radio traffic channel. The network element may be a packet control unit. The packet control unit may be associated with the base station system. The at least one radio traffic channel may be capable of accommodating multiple data calls from at least two of the user terminals;

The present invention also includes a user terminal for use in a mobile radio telecommunications (RT) network for switching data between user terminals and a data network, the RT network comprising: a base station system including at least one radio transceiver; and at least one data radio traffic channel for communication between the RT network and the user terminals, a data service requiring the setting up of a data traffic channel between a user terminal and the base station system;

wherein when a downlink data radio traffic channel is assigned to one of the user terminals;

the one user terminal is adapted to request reservation of an uplink data radio channel before the release of the assigned downlink data radio traffic channel. The user terminal may be a mobile terminal such as a mobile telephone or a stationary terminal such as a lap-top or a personal computer with a radio antenna. The user terminal may be adapted to request reservation of the uplink channel by in-band signaling. The at least one radio traffic channel may be capable of accommodating multiple data calls from at least two of the user terminals.

The present invention will now be described with reference to the following drawings.

BRIEF DESCRIPTIONS OF THE DRAWINGS

DESCRIPTION OF THE ILLUSTRATIVE EMBODIMENTS

The present invention will be described with reference to certain embodiments and with reference to certain drawings but the present invention is not limited thereto but only by the claims. In particular the present invention will mainly be described with reference to cellular mobile telephone systems but the present invention is not limited thereto. For instance, the present invention may be advantageously used in wireless local area networks (LAN) or Metropolitan Access Networks particularly when there is an asymmetrical flow of data. Various types of wireless LAN have been standardized or are in general use, e.g. the standards IEEE 802.11, IEEE 802.11HR (Spread Spectrum) and systems based on DECT, Blue Tooth, HIPERLAN, Diffuse or point-to-point infrared. Wireless LAN s are discussed in detail in "Wireless LAN's" by Jim Geier, Macmillan Technical Publishing, 1999. Further, the present invention will mainly be described with reference to a TDMA system such as GSM or GPRS but the present invention is not limited thereto. The sharing of a data channel by multiple user terminals may include for instance sharing a code in a CDMA system or sharing a frequency in a Frequency Division Multiple Access system. Further, the present invention will mainly be described with respect to a cellular mobile telephone system but the present invention may find advantageous use in a Public Mobile Radio (PMR) system.

Figure 1:
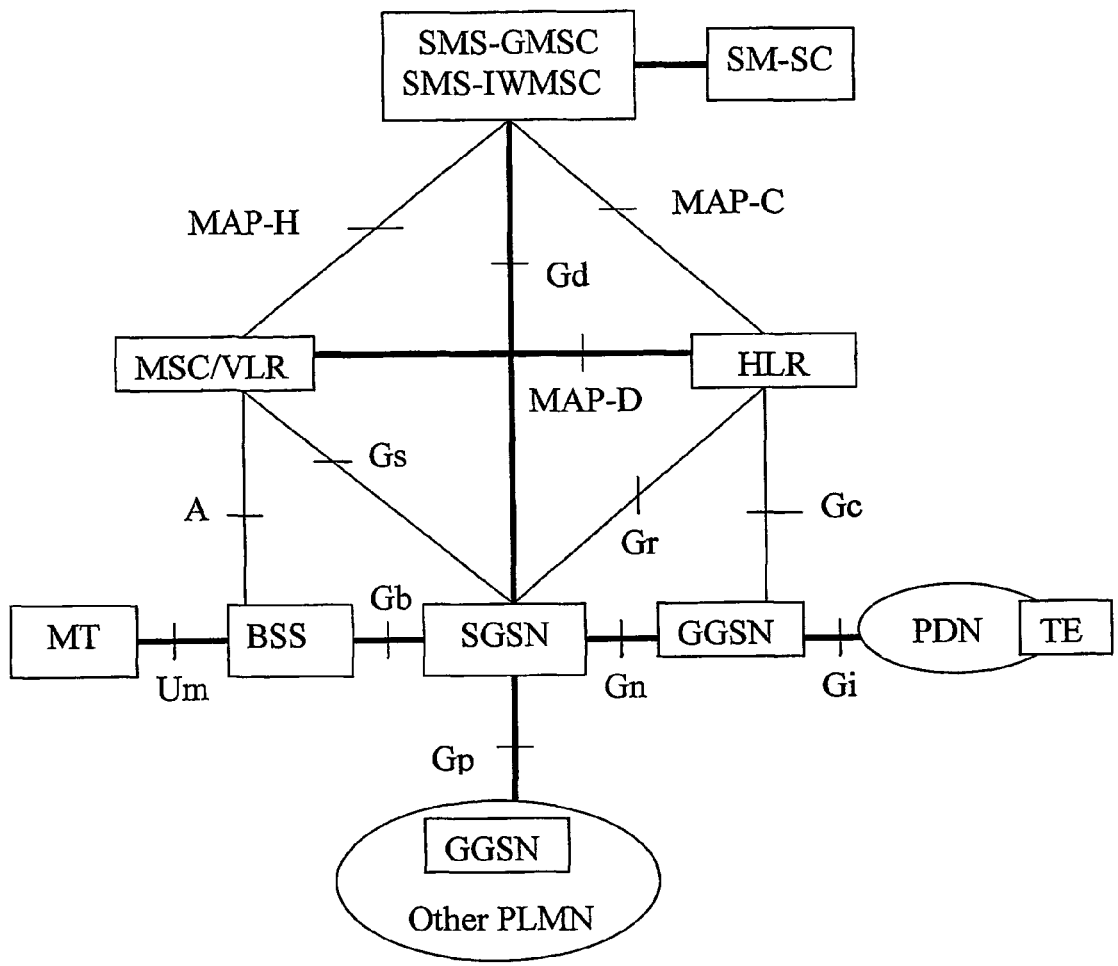
FIG. 1 is a schematic representation of a GPRS system combined with a GSM mobile telephone system.
Figure 2:
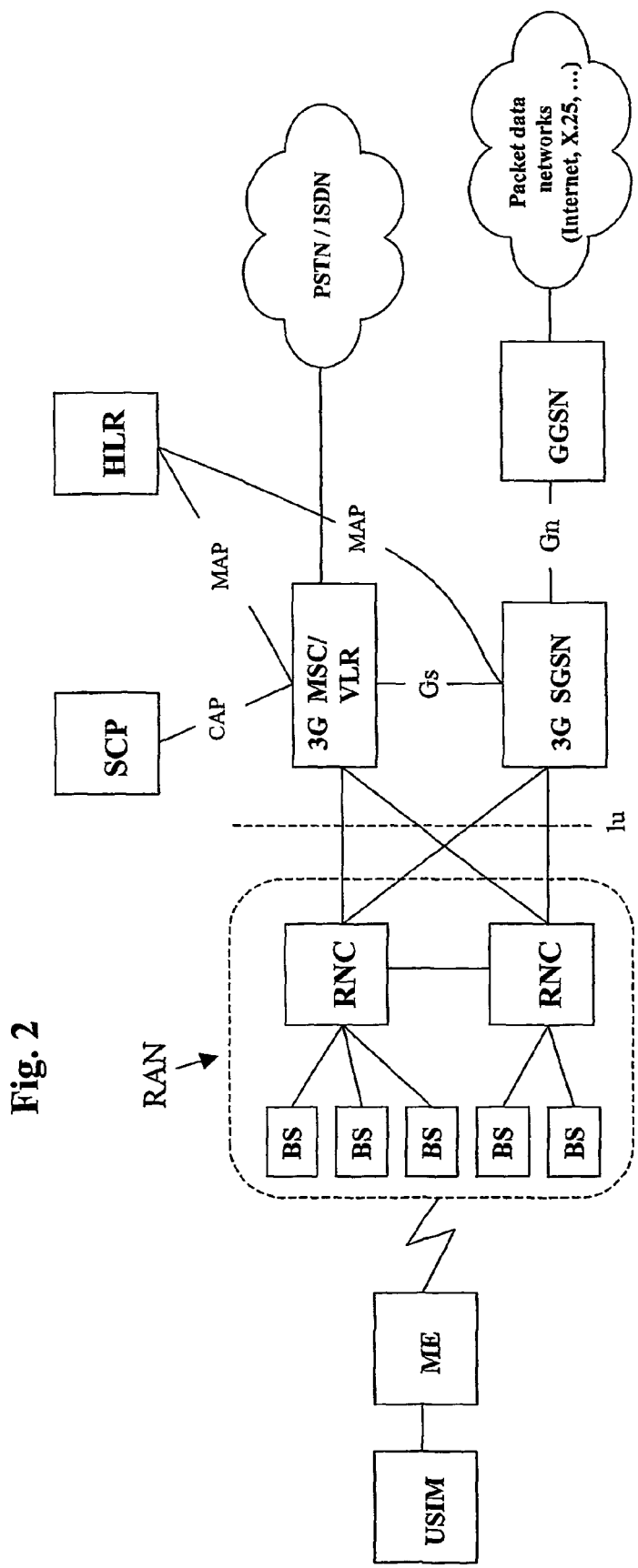
FIG. 2 is a schematic representation of a GPRS system incorporated in a Third generation mobile telephone system.
Figure 3:
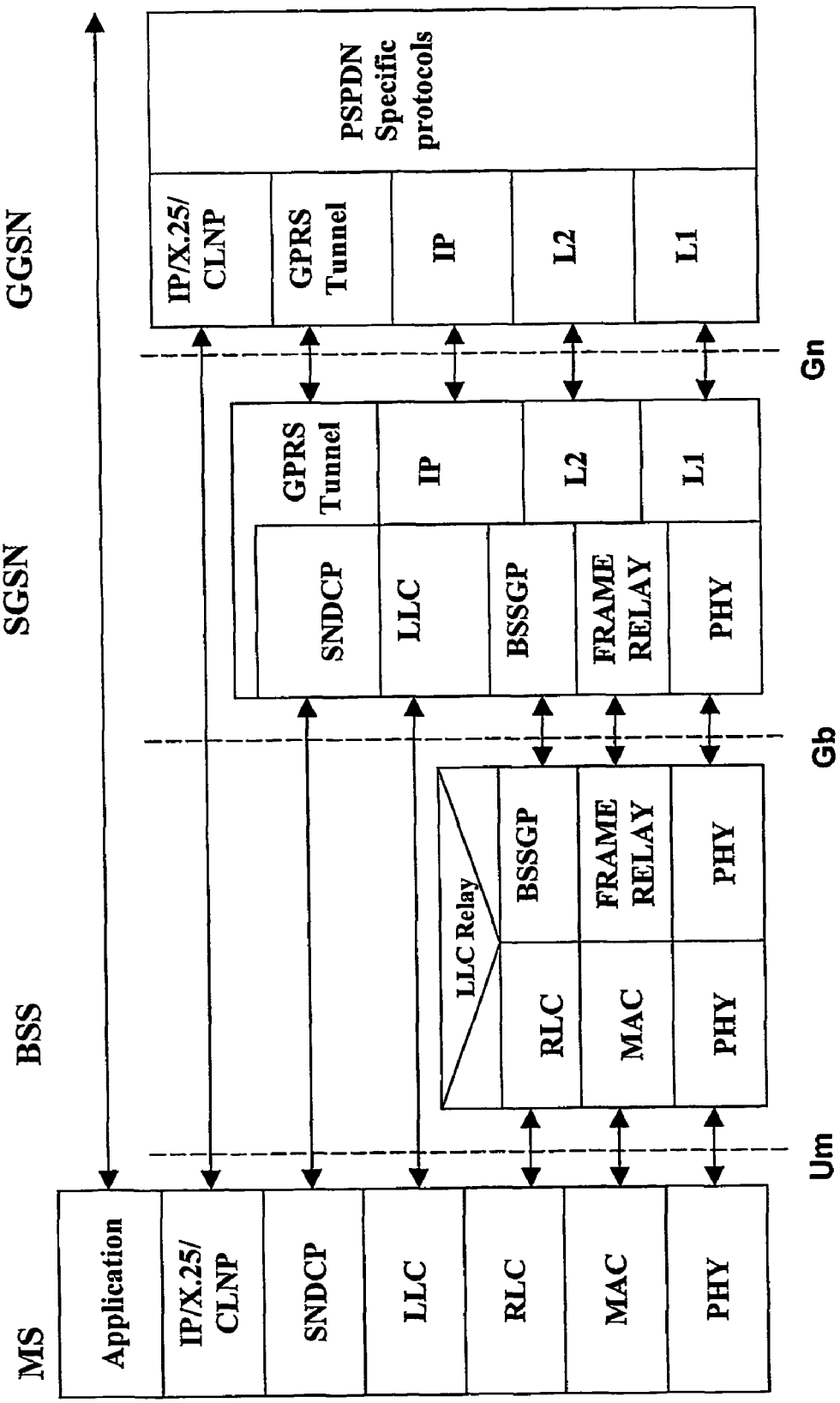
FIGS. 3 and 4 are representations of traffic and signaling protocols of a GPRS system, respectively.
Figure 4:
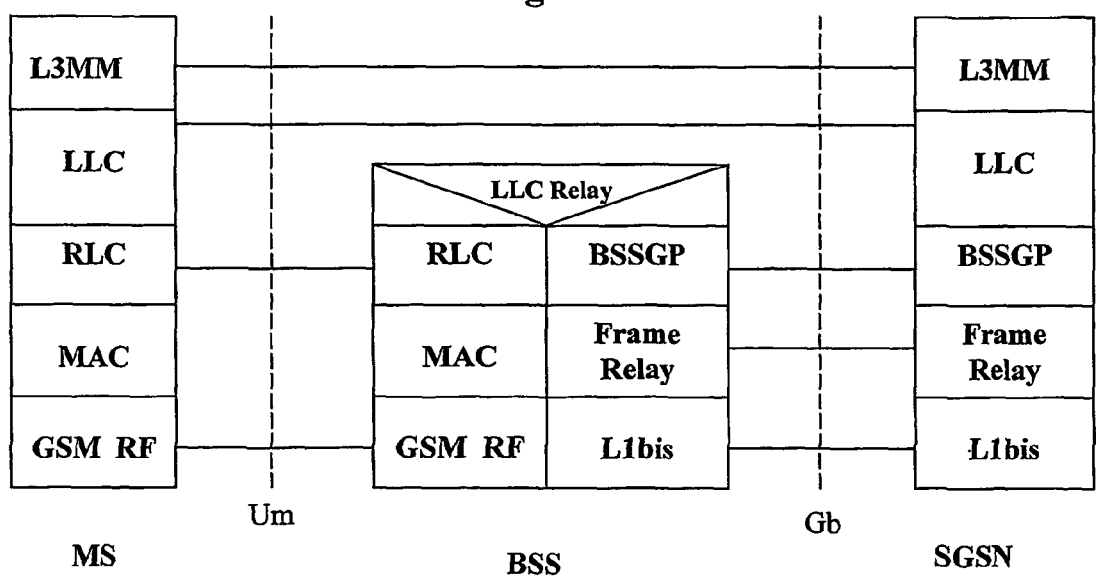
Figure 5:
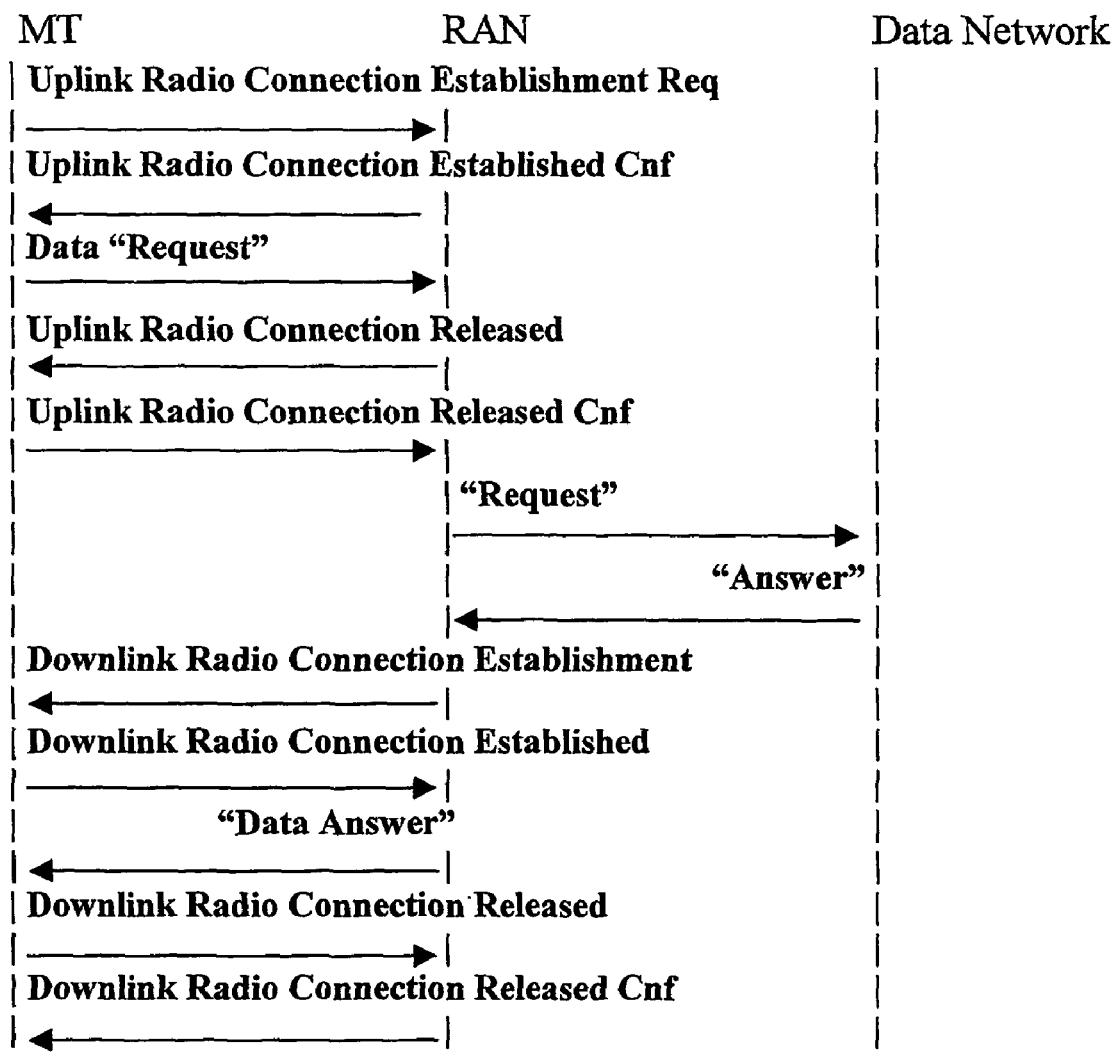
FIG. 5 is a message flow of a conventional uplink data transmission in a GPRS system.
Figure 6:
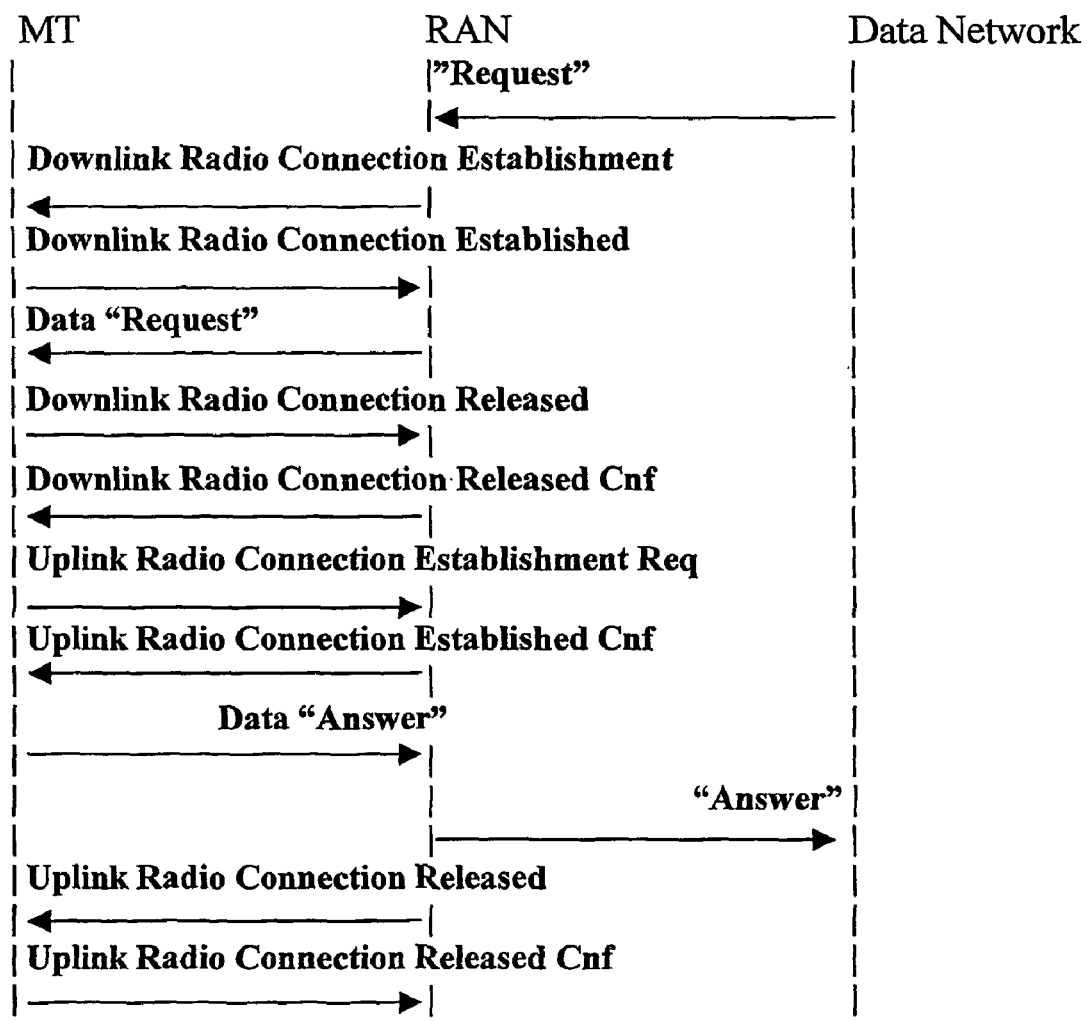
FIG. 6 is a message flow of a conventional downlink data transmission in a GPRS system.
Figure 7:
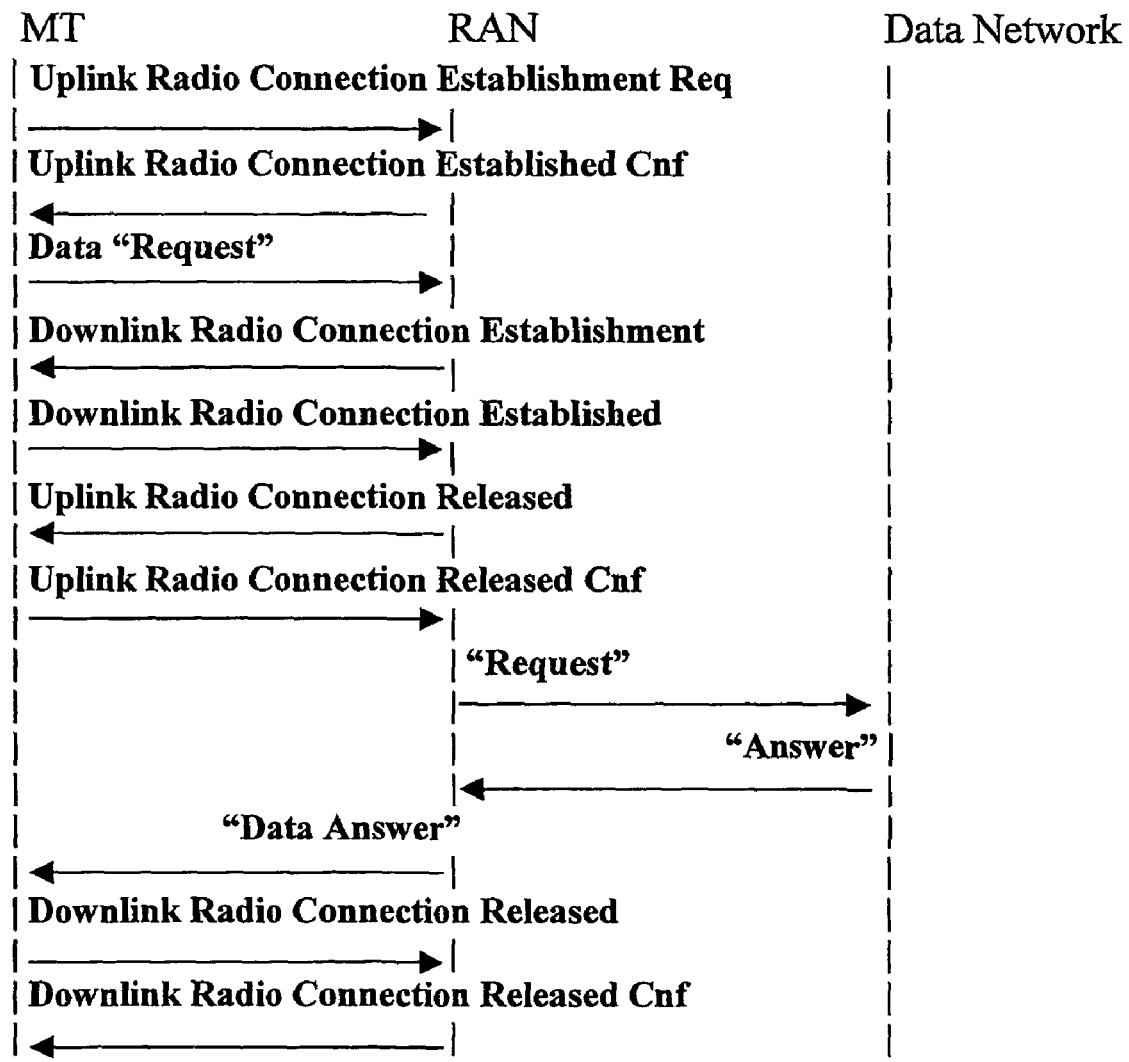
FIG. 7 is a message flow of an uplink data transmission in accordance with an embodiment of the present invention.
Figure 8:
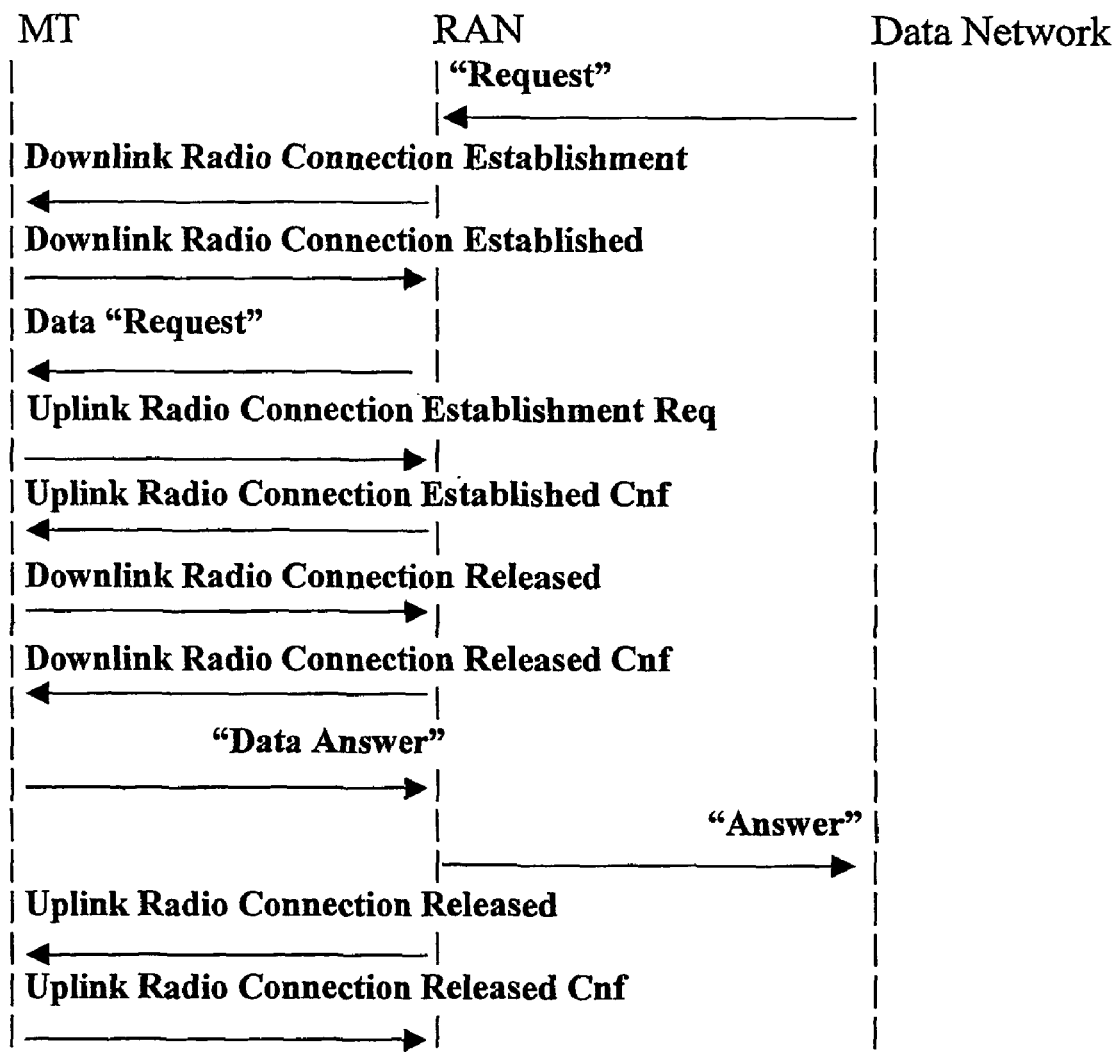
FIG. 8 is a message flow of an downlink data transmission in accordance with an embodiment of the present invention.

A network useful with the present invention may be as described with reference to FIGS. 1 and 2 above. The present invention relates to the way radio resources are managed and to a more optimum allocation of such resources. Message flows in accordance with an embodiment of the present invention are shown in FIGS. 7 and 8. FIG. 7 shows the situation when the message is initiated from the MT. The uplink radio connection establishment request, the confirmation thereof and the transfer of data from the MT remain as previously described with reference to FIG. 5. However, sometime before the end of the transfer of data from the MT to the RAN, the RAN carries out a downlink connection establishment in preparation for the downlink answer from the Internet to the data sent by the MT. This is based on the idea that the probability of an answer to the MT data is high. Once the data is transmitted from the MT to the RAN, the uplink connection is released. The downlink connection establishment may be set up via in-band signaling, that is within the same timeslot as the MT uses for uplink transmission.

In effect no (or a small amount of) radio resources are allocated (reserved) as such for this future reply. The RAN provides an identification (Temporary Flow Identity, TFI) to the MT which is used as a label for the forthcoming reply so that the MT can recognize when the message is transmitted. The MT remains camped on the respective timeslot on which this reply will come, and "listens" for the relevant TFI for a predetermined period of time, let us say 5 seconds. The MT decodes each block in the relevant timeslot to determine if the relevant block contains the relevant TFI. If the reply does not come by the end of this time, then the reserved downlink connection is released. On the other hand if the message arrives it can be immediately transferred to the MT. As several MT's can share a slot, an additional MT which simply listens for a transmission does not per se take up resources. Where there is a limit on the number of MT's which can share one timeslot, the additional MT does reserve some resources not available to another user. Hence, it is preferred to keep the time-out duration short, e.g. 5 seconds. The downlink initiated case is shown in FIG. 8. In this case the MT makes an uplink connection establishment request before the end of the downlink transmission in anticipation of a reply thereto. Again the request can be made in-band. This request may be an option which is settable by the user. If no answer is necessary the uplink connection is released by the RAN after a suitable time-out, e.g. 5 seconds.

The above embodiment is based on the following concept. The additional resources required to maintain the downlink or uplink resources in the expectation of use are small or zero. On the other hand the potential reduction in delay and particularly the reduction of buffer capacity in the downlink is an advantage which outweighs any additional cost. It is expected that the relative frequency of transfer of a large amount of data to an MT initiated from the network side is likely to be much lower than transfers of large amounts of data from the network side which have been triggered by a request from the MT. For example the usual browser dialog with the Internet is asymmetrical, the majority of the data being transferred from the Internet to the MT following an action carried out by the MT. The present invention provides a means for reducing the network-side delays for the transmission of data from the network to the MT which have been triggered by an MT action. This reduces the buffering required on the network side.

Figure 9:
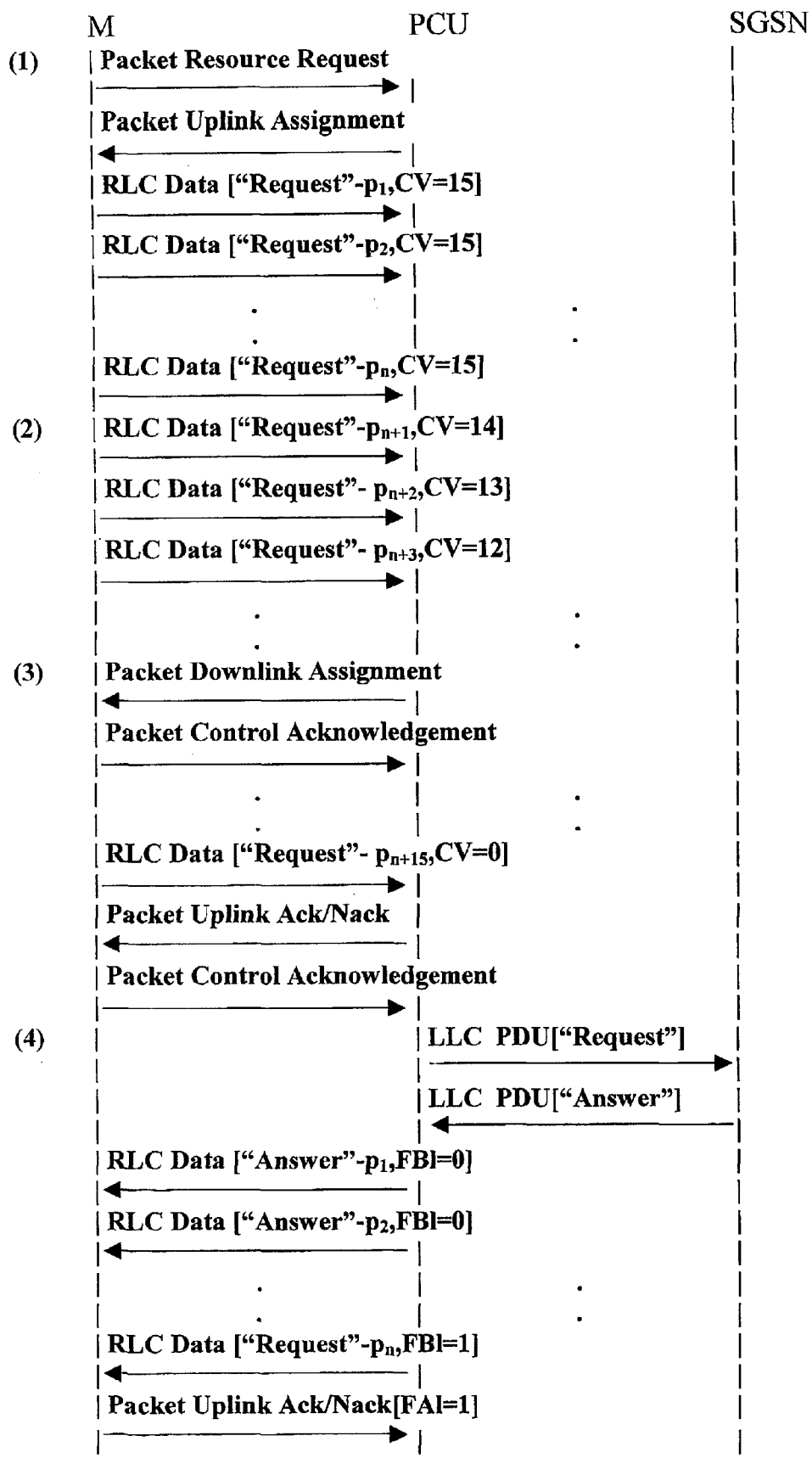
FIG. 9 is a message flow of an uplink data transmission in accordance with another embodiment of the present invention.
Figure 10:
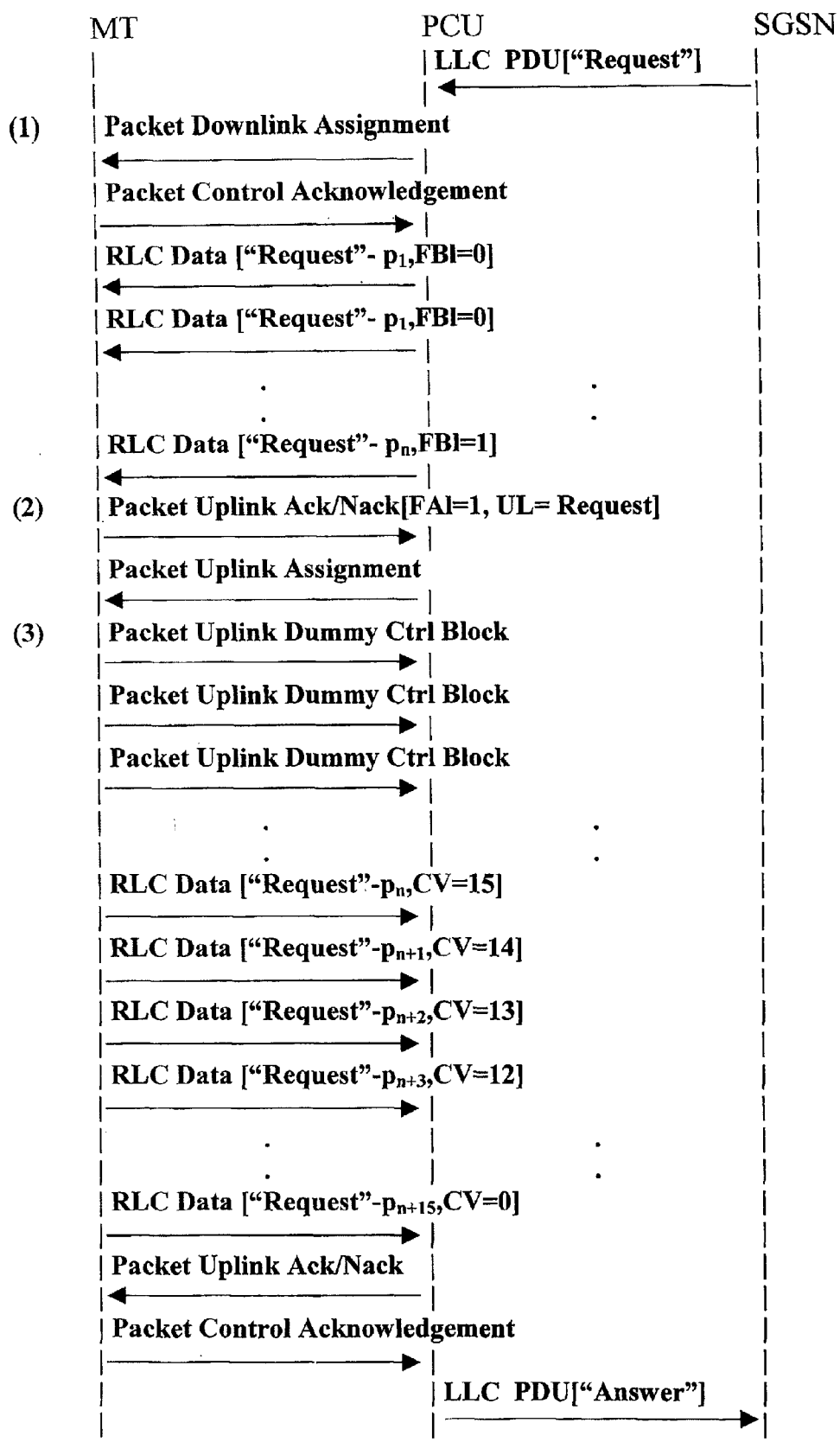
FIG. 10 is a message flow of an uplink data transmission in accordance with an embodiment of the present invention.

A more detailed scheme for carrying out the above embodiment is shown in FIGS. 9 and 10. The message flows are between the MT and the PCU and between the PCU and the SGSN. FIG. 9 shows the case of an MT initiated request for data transfer. Initially the MT makes a request for data transfer, e.g. a Packet Resource Request on a control channel. This control channel may be a random access channel and the Resource Request may be transmitted several times (in case of contention). This request is assigned by the PCU to a specific traffic channel, i.e. to a timeslot or slots, with a Packet Uplink Assignment message which contains the relevant TFI as well as the exact time when the transmission must take place. The MT now transmits the data required in a traffic channel using the timeslot specified at the appropriate time. When the amount of data left to be transmitted has reached a certain point, indicative that the data transmission is close to the end, the PCU initiates a downlink assignment in anticipation of a reply to the data from the network side. This downlink assignment may be transmitted in-band, i.e. within the same timeslot as is being used by the MT for the uplink transmission. In the assignment is the TFI which the MT should use to identify the reply when it comes. To allow tracking of the end of the uplink data transmission, the MT provides a reference identification, e.g. a "CV" (Countdown Value), which counts down the last few blocks of the transmission, e.g. the last 15 blocks. Hence, when the PCU determines that the CV starts to drop below 15, it initiates the establishment of the downlink connection.

After the uplink data has been transmitted, the PCU determines whether there were any bad frames and requests retransmission from the MT of any frames or blocks that are necessary. Then the uplink connection is released while keeping the downlink connection. The MT continues to listen for the relevant TFI in the allocated timeslot for a period of time, e.g. 5 seconds. The MT decodes every block in the timeslot allocated to it to see if it contains the specified TFI. If no reply comes within the predetermined time, the PCU initiates release of the downlink connection and the MT no longer listens on this timeslot.

A message flow of a downlink initiated transmission is shown in FIG. 10. Following a request from the network via the SGSN, the PCU initiates a packet downlink assignment to the relevant MT using a control channel. The request may be the simple arrival of data specified for transmission to the relevant MT. The assignment message from the PCU includes the timeslot to be used and TFI data. The MT replies on the same control channel (or in-band on the assigned time-slot) with an acknowledgment. The MT then begins decoding all blocks transmitted on the traffic channel in the relevant timeslot. Where the MT determines the specified TFI in a block, this block is processed fully by the MT. When the MT receives the final block of the downlink transmission, the MT then makes a request for an uplink connection. Due to the fact that the network is in control of the allocation of resources it is not necessary to use the CV count down procedure as described with reference to FIG. 9 as there is no danger that the network will release the connection until the MT has acknowledged safe receipt. The request for an uplink connection may therefore be included in the acknowledgment (ACK) at the end of the data transmission or with an error report (NACK) transmitted when some of the blocks have not been received correctly. On receipt of the request the PCU sets up an uplink connection. The MT then sends the reply or if the reply is not ready immediately, a series of dummy blocks if these are required for correct system functioning (e.g. power control). The reply data is then sent on the uplink connection. Towards the end of this transmission the CV count down procedure is initiated Once the CV drops below the maximum value, e.g. 15, the PCU knows that the transmission is coming to an end. The PCU may then initiate a further downlink request as described with reference to FIG. 9. Similarly the procedure described in FIG. 9 may terminate with an uplink packet resource request in the final Packet Uplink ACK/NACK so that an uplink connection is reserved for the next reply from the MT. Note however, that an uplink reservation does use up radio resources and is therefore less preferred.

The following describes some aspects of the present invention. In a radio telecommunications system which allows data transfer across an air interface a first data radio traffic channel is set up either in the uplink or downlink direction (from a user terminal to the radio network or from the radio network to a user terminal, respectively) and before this first traffic channel is released a corresponding second downlink, respectively uplink radio traffic channel is reserved. This reservation preferably occurs only after some of the traffic data has been transmitted on the first channel.

When the first traffic channel is a downlink channel the request for reservation can come from the user terminal (conditional reservation) or can be reserved automatically by the network. The automatic reservation may be determined by a certain user terminal profile available at the time of setting up of the first downlink data traffic channel. This user terminal profile indicates whether the user has access to this service and may be transmitted from the user terminal at the time of setting up of the first downlink traffic channel or may be available from the network, e.g. may be stored with other parameters of the user profile in the Home Location Register (HLR).

When the first traffic channel is an uplink channel, the second downlink traffic channel can be reserved automatically by the radio network or can be reserved by the network only if a previous request has been received from the relevant user terminal (conditional reservation). The automatic reservation may be determined by a certain user terminal profile available at the setting up of the first uplink data traffic channel, this profile indicating whether the user has access to this service. This user terminal profile may be transmitted from the user terminal at the time of setting up of the first uplink traffic channel or may be available from the network, e.g. may be stored with other parameters of the user profile in the Home Location Register (HLR). The approaching end of the uplink transmission is preferably flagged in some way, e.g. a countdown value relating to the amount of data, e.g. the number of data blocks, still to be transmitted.

The corresponding second traffic channel survives the release of the first traffic channel. Preferably, the second channel survives the release of the first channel for a predetermined period of time, e.g. 5 seconds. Within this time period if any answering message from the radio network or from the user terminal, respectively, becomes available this is transmitted via the reserved channel. Preferably, more than one user terminal may use a data traffic channel concurrently, i.e. a traffic channel may be shared by more than one user terminal. Whether or not a specific downlink data message is destined for a particular user terminal can be determined by an identifier for that user terminal, e.g. by a Temporary Flow Identity (TFI). This identifier survives (maintains its relevance) only for the duration of the channel, i.e. it does not code for the user terminal uniquely but is merely used for identification of messages to or from a particular user terminal for the time period of the respective channel transmission.

While the invention has been shown and described with reference to preferred embodiments, it will be understood by those skilled in the art that various changes or modifications in form and detail may be made without departing from the scope and spirit of this invention. For instance, the request for reservation of a downlink channel has been described in accordance with in-band signaling but, if the protocols allow it, the request may be made by another type of channel, e.g. a control channel.

The invention claimed is:

1. A mobile radio telecommunications (RT) network for switching data between user terminals and a data network, the RT network comprising:
   a base station system including at least one radio transceiver; and
   at least two data radio traffic channels, which are capable of communicating data between the RT network and at least one of said user terminals;
   wherein when a first data radio traffic channel is assigned to said at least one of said user terminals, which is capable of communicating data in a first direction between said RT network and said at least one of said user terminals, and in conjunction therewith, said RT network is adapted to reserve a second data radio traffic channel, in anticipation of communicating data in a second direction, different from the first direction, between said RT network and said at least one of said user terminals, before release of said first data radio traffic channel.

2. The RT network according to claim 1, wherein said at least one of said user terminals is adapted to request reservation of said second data radio traffic channel before release of said first data radio traffic channel.

3. The RT network according to claim 2, wherein said at least one of said user terminals is adapted to request reservation of said second data radio channel by in-band signaling.

4. The RT network according to claim 1, wherein at least one of said at least two data radio traffic channels is capable of accommodating multiple data calls from at least two of said user terminals.

5. The RT network according to claim 4, wherein accommodating multiple data calls from at least two of said user terminals includes sharing of a timeslot in a TDMA system or sharing of a code in a CDMA system.

6. The RT network according to claim 1, wherein a data radio channel request is used to request data transmission in said first or said second direction.

7. The RT network according to claim 1, wherein said second data radio traffic channel survives the release of said first data radio traffic channel.

8. The RT network according to claim 1, wherein said RT network is adapted to reserve the second data radio traffic channel conditional on a request.

9. The RT network according to claim 1, wherein said RT network is adapted to reserve automatically the second data radio traffic channel.

10. The RT network according to claim 9, wherein said RT network is adapted to automatically reserve the second data radio traffic channel based on a user terminal profile.

11. The RT network according to claim 1, wherein said RT network is adapted to reserve the second data radio traffic channel when the probability of an answering message is high.

12. A method of operating a mobile radio telecommunications (RT) network for switching data between user terminals and a data network, the RT network comprising a base station system including at least one radio transceiver, and at least two data radio traffic channels, which are capable of communicating data between the RT network and at least one of said user terminals, the method comprising the steps of:
   assigning a first data radio traffic channel to said at least one of said user terminals, which is capable of communicating data in a first direction between said RT network and said at least one of said user terminals; and, and in conjunction therewith,
   reserving a second data radio traffic channel, in anticipation of communicating data in a second direction, different from the first direction, between said RT network and said at least one of said user terminals, before release of said first data radio traffic channel.

13. The method according to claim 12, further comprising the step of requesting reservation of said second data radio traffic channel before release of said first data radio traffic channel.

14. The method according to claim 12, wherein said reserving step includes the step of automatically reserving said second data radio traffic channel before release of said first data radio traffic channel.

15. The method according to claim 12, further comprising the step of accommodating at least two data calls from at least two of said user terminals on at least one of said at least two data radio traffic channels.

16. The method according to claim 15, wherein said accommodating step includes the step of sharing of a timeslot in a TDMA system or sharing of a code in a CDMA system.

17. The method according to claim 12, further comprising the step of transmitting data along said first or said second data radio traffic channel, said step of transmitting including the step of requesting a data radio traffic channel.

18. The method according to claim 12, wherein said reserving step includes the step of in-band signaling.

19. The method according to claim 12, wherein said second data radio traffic channel survives the release of said first data radio traffic channel.

20. The method according to claim 12, wherein the reserving of the second data radio traffic channel is conditional on a request.

21. The method according to claim 12, wherein the reserving of the second data radio traffic channel is automatic.

22. The method to claim 21, wherein the automatic reserving of the second data radio traffic channel is reserved when the probability of an answering message is high.

23. A network element for use in a mobile radio telecommunications (RT) network for switching data between user terminals and a data network, the RT network comprising
   a base station system including at least one radio transceiver and
   at least two data radio traffic channels, which are capable of communicating data between said PT network and at least one of said user terminals,
   wherein when a first data radio traffic channel is assigned to said at least one of said user terminals, which is capable of communicating data in a first direction between said RT network and said at least one of said user terminals, and in conjunction therewith, said network element is adapted to initiate reservation of a second data radio traffic channel, in anticipation of communicating data in a second direction, different from the first direction, between said RT network and said at least one of said user terminals, before release of said first data radio traffic channel.

24. The network element according to claim 23, wherein said network element is a packet control unit.

25. The network element according to claim 24, wherein said packet control unit is operatively connected to the base station system.

26. The network element according to claim 23, adapted to initiate the reservation of the second data radio traffic channel conditional on a request.

27. The network element according to claim 23, adapted to initiate the reservation of the second data radio traffic channel automatically.

28. The network element according to claim 27, wherein said network element is adapted to automatically reserve the second data radio traffic channel based on a user terminal profile.

29. The network element according to claim 23, adapted to reserve the second data radio traffic channel when the probability of an answering message is high.

30. A user terminal for use in a mobile radio telecommunications (RT) network for switching data between said user terminal and a data network, the RT network comprising
- a base station system including at least one radio transceiver and
- at least two data radio traffic channels, which are capable of communicating data between the RT network and said user terminal,
- wherein when a first data radio traffic channel is assigned to said user terminal, which is capable of communicating data in a first direction between said RT network and said user terminal,
- and in conjunction therewith, said user terminal is adapted to request reservation of a second data radio traffic channel, in anticipation of communicating data in a second direction, different from the first direction, between said RT network and said user terminal, before release of said first data radio traffic channel.

31. The user terminal according to claim 30, wherein the user terminal is a mobile terminal.

32. The user terminal according to claim 30, wherein the user terminal is adapted to request reservation of said second data radio traffic channel by in-band signaling.

33. The user terminal according to claim 30, adapted to initiate the reservation of the second data radio traffic channel automatically.

34. The user terminal according to claim 33, wherein said network element is adapted to automatically reserve the second data radio traffic channel based on a user terminal profile.

35. The user terminal according to claim 30, adapted to reserve the second data radio traffic channel when the probability of an answering message is high.

* * * * *